United States Patent [19]

Geller

[11] Patent Number: 5,238,127
[45] Date of Patent: Aug. 24, 1993

[54] PAN HOLDER

[76] Inventor: Edward W. Geller, 3750 79th Ave. SE., Mercer Island, Wash. 98040

[21] Appl. No.: 844,121

[22] Filed: Mar. 2, 1992

[51] Int. Cl.$^5$ .............................................. A47F 5/00
[52] U.S. Cl. ...................................... 211/13; 211/71; 211/113
[58] Field of Search .................. 211/113, 117, 13, 71; 248/317, 320, 325, 327; 312/245, 297, 312, 246, 248

[56] References Cited

U.S. PATENT DOCUMENTS

| | | | |
|---|---|---|---|
| 2,492,697 | 12/1949 | Higley | 312/248 X |
| 3,003,731 | 10/1961 | Balch et al. | 248/320 X |
| 3,737,209 | 6/1973 | Manor | 211/117 X |
| 4,290,531 | 9/1981 | Lazarus | 211/71 |
| 4,485,928 | 12/1984 | Staashelm | 211/38 X |
| 4,699,437 | 10/1987 | Generaux | 312/246 X |
| 4,760,926 | 8/1988 | Iuni | 211/13 |

Primary Examiner—Robert W. Gibson, Jr.

[57] ABSTRACT

A pan holder, attached to the ceiling, stores pans in an overhead position near the end of a flexible cantilever beam which is the working element of the holder. By pulling down, the holder is lowered to allow easy removal and attachment of the pans. The holder can be used for items other than pans and is designed so that it can be attached to a dry wall ceiling.

10 Claims, 2 Drawing Sheets

PAN HOLDER

BACKGROUND OF THE INVENTION

This invention relates generally to storage devices and more particularly to pan holders. For traditional pan holders, pans are suspended at a height such that they can be easily removed and attached. At such height the pans are typically too low to walk under. Thus traditional pan holders are usually mounted over a counter or an island. In order to increase the options where a pan holder can be mounted, it is desirable to have the pans suspended high enough to allow persons to walk under them and to have a holding device that can be lowered so that the pans can be easily attached and removed particularly by short persons. For a ceiling height of 8 feet which is typical, it is desirable to suspend pans as near to the ceiling as possible in order to accommodate large pans and yet have head room under the pan holder for tall persons. The holding device should allow the pans to be lowered at least one foot from their high storage position.

SUMMARY OF THE INVENTION

The principal object of the present invention is to provide a holder, on which items such as pans can be stored in a high position so as not to provide undo impediment to walking below them, and for which the items can be lowered so that they can be easily attached to and removed from the holder. It is another object of the present invention to be able to attach the holder to a ceiling composed of dry wall.

These and other objects are achieved using a flexible cantilever beam as a spring element and a mounting base which transmits forces to the ceiling. The pans are attached near the unsupported end of the beam and the fixed end of the beam is held by the base which is attached to the ceiling. The base is extended toward the line of action of the pan weights and the pull force that is used to lower the pans so as to minimize the attachment force exerted on the ceiling, thus allowing attachment to a dry wall ceiling.

DETAILED DESCRIPTION OF THE INVENTION

Figure 1:
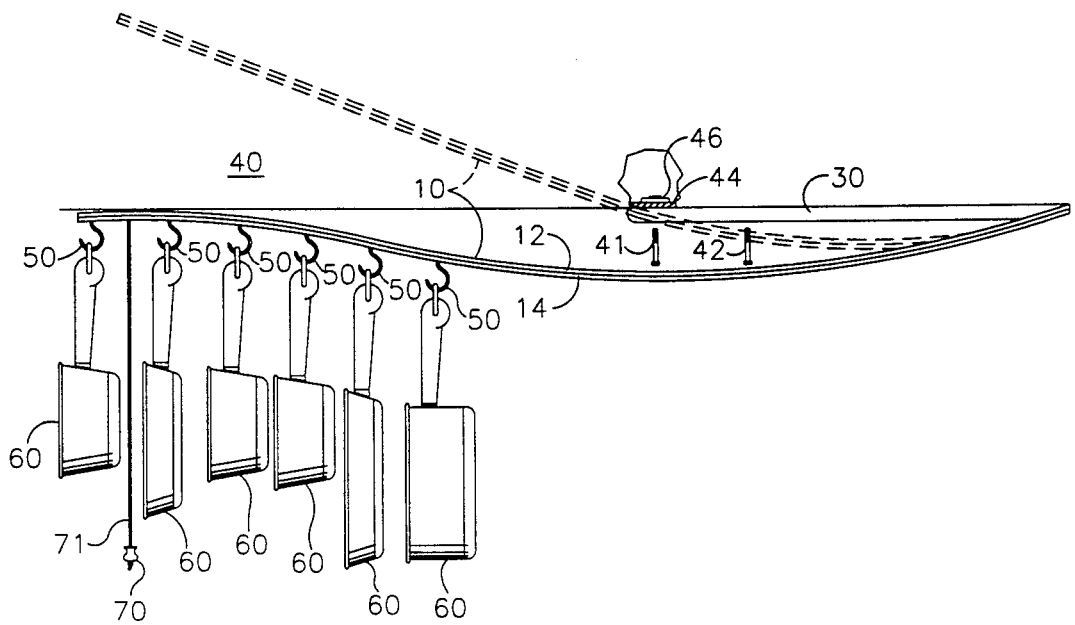
FIG. 1 is a side view of the preferred embodiment of the invention in the high position.
Figure 2:
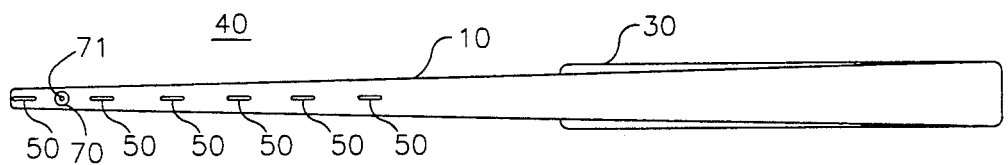
FIG. 2 is a bottom view of the invention.

The invention is a holder for pans or other items, and the preferred embodiment is shown is side view in FIG. 1 and in bottom view in FIG. 2. Although the device is shown holding pans, and although the device is herein called a pan holder, it should be understood that the holder may be used with equal advantage for storage of other items. In terms of mechanical function the device is a spring assembly whose basic elements are a spring unit consisting of a flexible cantilever beam which holds the pans and a base for positioning the beam with respect to the ceiling.

In FIG. 1 the device is shown in the configuration wherein the pans 60 are held in a high storage position. The intent is to use the space near the ceiling 40 for storage so that the space under the pans 60 can be used as a walk space. The pans 60 are brought to the lower position shown in side view in FIG. 3 by pulling on the pull-down cord 71 with knob 70 or by pulling on any of the pans 60. In this lower position the pans 60 can be more easily removed from or attached to the holder.

The main working element of the pan holder is a spring in the form of a beam 10 which is cantilevered and to which pans 60 are affixed by suitable means toward the unsupported end. The means of attachment of pans 60 shown in FIG. 1 are hooks designated by reference character 50. Six pans are shown in FIG. 1. The holder can be designed for any number of pans. The pull-down cord 71 with knob 70 is fastened to beam 10 near its unsupported end.

The preferred embodiment shown in FIG. 1 uses laminated wood construction for beam 10 such that in the unloaded state, beam 10 is prestressed and is curved upward as indicated by the dotted lines in FIG. 1. More specifically, beam 10 is composed of an upper wood strip 12 and a lower wood strip 14 which in the manufacturing process are glued together while being held in a jig in a curved shape. More than two laminating strips can be used but a suitable unloaded shape and a suitable prestress can be obtained with only two laminations. The bending of beam 10 into a curved shape in the jig must not impose fiber stress that exceeds the elastic limit of the material of composition of beam 10. However, to maximize the advantages of prestress for beam 10, it is suggested that jig bending be of such magnitude that this limiting stress condition be nearly obtained during manufacture. Although beam 10 is shown with constant thickness in side view in FIG. 1, it can be tapered in side view to increase flexibility, but use of such taper increases the manufacturing cost considerably. The preferred embodiment of FIG. 1 is shown in bottom view in FIG. 2 without the pans 60. Note that in FIG. 2, beam 10 is shown with taper as viewed from below. This taper is not essential, however the cost to incorporate this characteristic for increasing flexibility is small.

Although the preferred embodiment uses a hard wood such as ash, other materials of composition such as plastic, fiber-reinforced plastic, or metal can be used. For metal, means other than gluing can be used to fasten laminate layers together. Spot welding or riveting are suggested means.

By suitable means of attachment, beam 10 is fastened at its fixed end to base 30. Base 30 in turn is fastened by suitable means to ceiling 40. Thus, base 30 provides a means for appropriately constraining the fixed end of beam 10 with respect to ceiling 40. The base 30 holds the fixed end of beam 10 at a particular slope relative to the ceiling 40 and at a particular vertical position relative to the ceiling 40. Consider the unloaded state of beam 10 when no pans are attached and when, for purposes of the following discussion, the beam 10 is constrained only by its fastening to base 30 and is not constrained by other portions of base 30 or by the ceiling 40. This unloaded position of beam 10 is illustrated by the dotted lines in FIG. 1. A general rule to use to determine the fixed-end constraint that base 30 applies to beam 10 is that as the unsupported end of beam 10 in its unloaded state, is raised, the amount of pans 60, in terms of weight, that can be supported in the desired high storage position, is increased, and concurrently the lowest position to which pans 60 can be pulled, without permanently deforming beam 10, is raised. As shown in FIG. 1, for simplicity in manufacture, the preferred embodiment has a base 30 which has constant thickness in side view except for a bevel at the end where it is attached to beam 10, which bevel establishes the slope and which thickness establishes the vertical position for the fixed end of beam 10. Defining bevel to be the angle between the ceiling 40 and the surface of contact between base 30 and beam 10, then according to the general rule given above, as the bevel is increased the maximum pan load that can be held proximate to the ceiling 40 is decreased and the amount that pans 60 can be lowered before beam 10 is permanently deformed is increased. likewise, according to the rule given above, increasing the thickness of base 10 gives a similar result. The method used by base 10 to hold the fixed end of beam 10, as described above, should not be construed to be the only method claimed by the invention.

Figure 3:
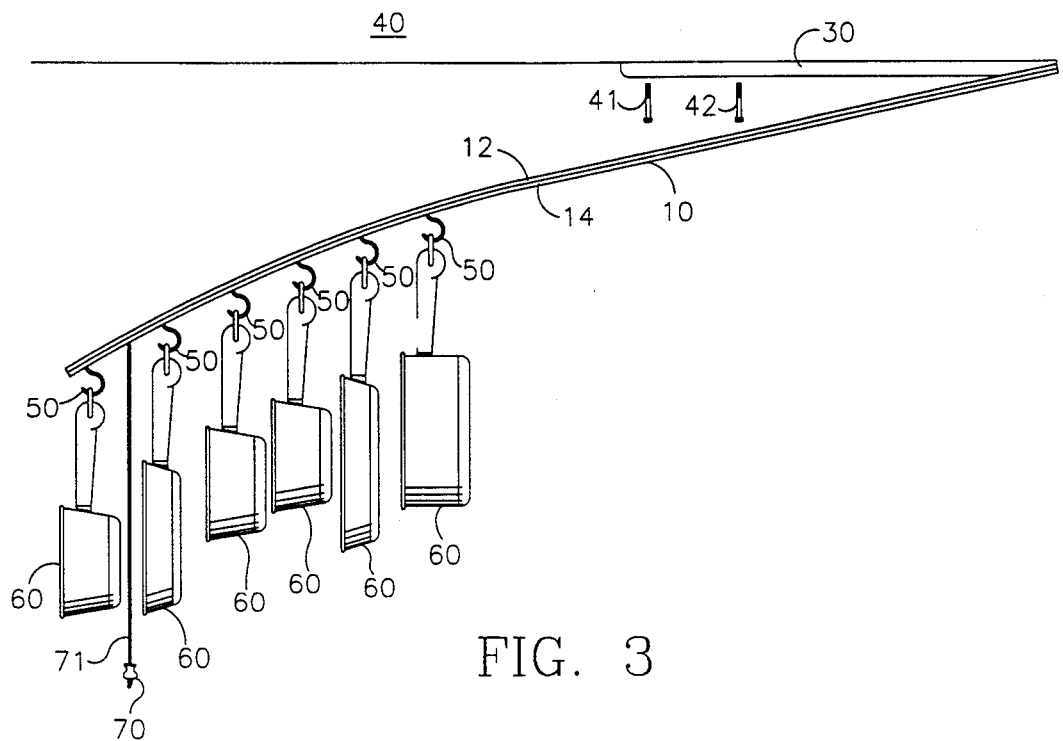
FIG. 3 is a side view of the preferred embodiment of the invention in the low position.

Base 30 as shown in the preferred embodiment of FIGS. 1, 2 and 3 is designed so that the pan holder can be attached to a dry wall ceiling if so desired. The base 30 is fastened to the ceiling 40 by suitable means. One of those means but not to be construed as the only means is the driving of two screws 41 and 42 through dry wall 44 into anchor nuts 46 as shown in FIG. 1. The two screws 41 and 42 are placed in close proximity to each other and near the end of base 30 opposite the end attached to the beam 10 in order to minimize the pull force exerted by the screws 41 and 42 onto the dry wall when the pans are pulled to their low position. A ceiling attachment screw is not needed near the end of the base 30 where the beam 10 is attached because base 30 pushes up on ceiling 40 in this region, screw 42 being sufficiently close to this end of base 30. As base 30 is lengthened, the two attachment screws 41 and 42 are placed closer to the line of action of the loads applied to beam 10 by the pans 60 and by a pull force on cord 71 with knob 70 and hence the pull force exerted on dry wall 44 via screws 41 and 42 is reduced. For attachment to a dry wall ceiling, a length for the base 30 of the order of one half the length of the beam 10 is recommended for a pan loading of the order of 10 pounds.

Even though the preferred embodiment is designed to allow attachment to dry wall as described above, this embodiment can be attached to ceiling joists if desired by using wood screws for screws 41 and 42.

Base 30, as described above for the preferred embodiment, allows the user to attach the holder to dry wall or to ceiling joist. This design for base 30 should not be construed to be the only one claimed by the invention. For example, the design would be different if attachment were to be limited to ceiling joists for which very high attachment forces can be sustained using wood screws. In that case, that portion of base 30 shown with constant thickness in side view in FIG. 1 can be eliminated so that base 30 becomes a simple wedge and the attachment screws 41 and 42 are wood screws driven up through beam 10, base 30, dry wall 44, if present, and into the joist.

The pan holder must be of such design that beam 10 is not permanently deformed when the pans 60 are brought to the desired lower position and of such design that with the desired pan load, the pans 60 are held in the desired upper position. Unfortunately, as discussed above, increasing the bevel or increasing the thickness of base 10 as seen in the side view, will be of aid for the first of these design requirements and will be a hindrance for the second. The characteristics of beam 10 that are available to help satisfy these requirements are noted in the following. To increase the flexibility of beam 10 in order to satisfy the first of these design requirements, these characteristics of the beam 10 are increased:

length,
taper in side view and in bottom view,
fiber stress at the elastic limit in bending for the material of composition, and these characteristics can be decreased:
thickness in side view,
average width in bottom view, and
modulus of elasticity of the material of composition.

To increase the load carrying capacity of beam 10 in order to meet the second design requirement, these characteristics of beam 10 are increased:
the average width of beam 10 in bottom view,
the prestress, and
the fiber stress at the elastic limit in bending for the material of composition.

Suggested choices for these determinants of flexibility and load carrying ability are given in the description of a working model given below. Two constraints can make the design difficult. Manufacturing costs limit the width of beam 10, and available space limits the length of the beam. In order to be able to rip strips 12 and 14 from readily available wood stock, and in order to manufacture units that will fit in typical kitchens, a maximum width of about 3 inches and a length of about 6 feet are suggested for beam 10.

A working model of the preferred embodiment illustrated in FIGS. 1, 2, and 3, satisfies suggested design requirements using appropriate choices for the characteristics elaborated above. This model has a base 30 with a 7 degree bevel, a 0.8 inch thickness, and a 3 foot length and has a prestressed two-strip laminated ash wood beam 10 that is 6 feet in length tapering from 2.75 inches to 1 inch in bottom view and having a 0.5 inch thickness in side view. In side view, the length of the contact surface between base 30 and beam 10 is 4.5 inches. The wood, ash, was chosen for its low modulus of elasticity and high stress at the elastic limit. The prestress was large by virtue of manufacture in a jig which bent strips 12 and 14 so as to obtain a maximum fiber stress near that for the elastic limit of ash. The model supports an 8 pound pan load in an upper position wherein all of the handles of pans 60 are within 3 inches of the ceiling 40 as illustrated in FIG. 1. The model can be pulled down as illustrated in FIG. 3 so as to lower the row of pans 60 from 1 foot at one end to two feet at the other end of the row without permanently deforming the beam 10 and without damaging the dry wall 44 to which the model was attached using two anchoring screws 41 and 42 placed 8 inches apart, screw 41 being 1 inch from the end of base 30 as illustrated in FIG. 3.

A second embodiment differs from the preferred embodiment with regard to the material and method of construction of beam 10. The beam for this second embodiment is constructed of metal and is not laminated, and the upward curve for the unloaded shape is obtained in manufacture by bending a straight beam beyond its elastic limit such that it is permanently deformed into the desired shape.

A third embodiment differs from the preferred and the second embodiment with regard to the material and method of construction of beam 10. The beam 10 for this third embodiment is molded using plastic which may be fiber-reinforced and the upward curve for the unloaded shape is obtained in manufacture by the molding process such that when removed from the mold, the beam has the desired shape.

Figure 4:
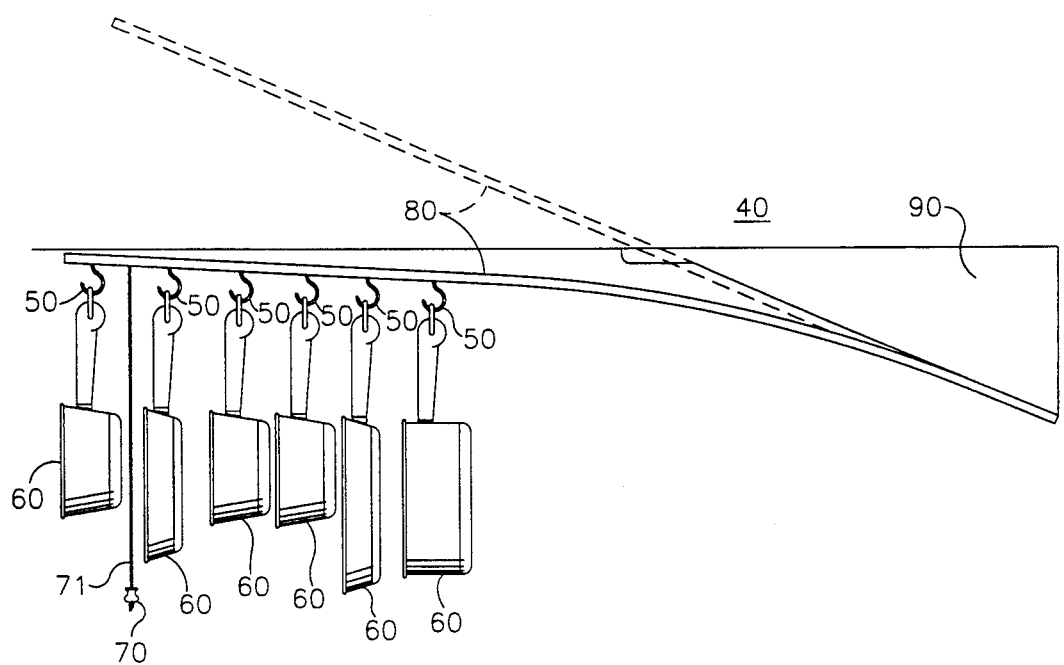
FIG. 4 is a side view of another embodiment of the invention in the high position.

A fourth embodiment, shown in FIG. 4 in side view, differs from the preferred, the second, and the third embodiment with regard to the method of construction of the beam 80 and with regard to the configuration of base 90. The beam 80 is composed of any suitably flexible material such as wood, metal, plastic, or fiber-reinforced plastic. The beam 80 is straight in the unloaded condition as shown by the dotted lines in FIG. 4 and is not prestressed and is therefore simple to manufacture. Appeal to the general rule given earlier for determining the appropriate constraints for the fixed end of base 90, indicates that the use of a beam 80 which is straight in its unloaded condition, as shown by the dotted lines for beam 80 in FIG. 4, requires that the fixed end of beam 80 be constrained to a slope of opposite direction and of greater magnitude and to a lower position relative to the ceiling than that for the preceding embodiments. To effect these constraints, base 90 must be configured as shown in FIG. 4. Compared to the preceding embodiments, base 90 is bulkier, extends a greater distance below the ceiling, and has a concave instead of a convex corner in the side view. These comparisons indicate a manufacturing and an aesthetic disadvantage for the base 90 of the fourth embodiment.

The foregoing describes a pan holder, which in terms of its mechanics is a spring assembly whose basic elements are a spring unit consisting of a flexible cantilever beam which holds the pans and a base for positioning the beam with respect to the ceiling and which in terms of its function is a device for storing pans in close proximity to the ceiling whilst allowing the pans to be pulled down to a position which allows for easy attachment and removal of the pans. The function of the present invention provides a clear advantage over traditional pan holders which hold pans at a fixed height where pans are accessible and which therefore limit head room under the pans. Also the function of the invention can be extended to storage of items other than pans. A 6 foot long working model demonstrates the ability to support a pan weight of 8 pounds in close proximity of the ceiling, to lower the pans between 1 and 2 feet, and to be attached to a ceiling dry wall. Since the embodiments described herein may undoubtedly be modified by those skilled in the art without departing from the scope and spirit of the invention, the foregoing detailed description is intended to be merely exemplary and not restrictive of the invention as will now be claimed hereinbelow.

I claim:

1. In a holder which moves items from a low position, wherein said items are easily attached to said holder, to a desired high position for storage of said items, and which moves said items, with application of a pull force, from said high position to said low position, wherein said items are easily removed, a spring assembly which positions said items in said high position and which provides for vertical movement of said items comprising:
   (a) a cantilever beam to which said items are attached by suitable means near the unsupported end, said cantilever beam by way of choice of material, length, width, thickness, taper, and method of construction, having flexibility such that said items can be supported in said high position and can be pulled down to said low position without permanently deforming said cantilever beam; and
   (b) a base to which the fixed end of said cantilever beam is attached by suitable means, said base being configured such that said fixed end is constrained by said base to a slope relative to the horizontal and to a vertical position relative to a ceiling to which said base is attached by suitable means, said slope and said vertical position being determined such that said items are supported at said high position by said cantilever beam.

2. The holder spring assembly of claim 1 wherein the said cantilever beam is curved and prestressed in its unloaded state by virtue of manufacture in a jig which holds together two or more layers of beam material in a curved position whilst suitable means are used to fasten the layers together, the amount of curve being limited in degree by the requirement that the elastic limit of said material not be exceeded.

3. The holder spring assembly of claim 1 wherein the said cantilever beam is of metal composition and has a curved shape in its unloaded state by virtue of being bent in manufacture such that the elastic limit of the metal of composition is exceeded and said cantilever beam is permanently deformed into said curved shape.

4. The holder spring assembly of claim 1 wherein the said cantilever beam is curved in its unloaded state by virtue of manufacture in a mold using plastic or reenforced plastic for the material of composition.

5. The holder spring assembly of claim 1 wherein the said cantilever beam is straight in its unloaded state.

6. A holder which moves items from a low position, wherein said items are easily attached to said holder, to a desired high position for storage of said items, and which moves said items, with application of a pull force, from said high position to said low position, wherein said items are easily removed, comprising:
   (a) a cantilever beam to which said items are attached by suitable means near the unsupported end, said cantilever beam by way of choice of material, length, width, thickness, taper, and method of construction, having flexibility such that said items can be supported in said high position and can be pulled down to said low position without permanently deforming said cantilever beam; and
   (b) a base to which the fixed end of said cantilever beam is attached by suitable means, said base being configured such that said fixed end is constrained by said base to a slope relative to the horizontal and to a vertical position relative to a ceiling to which said base is attached by suitable means, said slope and said vertical position being determined such that said items are supported at said high position by said cantilever beam, said base being extended toward the unsupported end of said cantilever beam to the extent that using suitable means for attachment to dry wall of which said ceiling may be composed, said dry wall can withstand the consequent attachment forces.

7. The holder of claim 6 wherein the said cantilever beam is curved and prestressed in its unloaded state by virtue of manufacture in a jig which holds together two or more layers of beam material in a curved position whilst suitable means are used to fasten the layers together, the amount of curve being limited in degree by the requirement that the elastic limit of said material not be exceeded.

8. The holder of claim 6 wherein the said cantilever beam is of metal composition and has a curved shape in its unloaded state by virtue of being bent in manufacture such that the elastic limit of the metal of composition is exceeded and said cantilever beam is permanently deformed into said curved shape.

9. The holder of claim 6 wherein the said cantilever beam is curved in its unloaded state by virtue of manufacture in a mold using plastic or re-enforced plastic for the material of composition.

10. The holder of claim 6 wherein the said cantilever beam is straight in its unloaded state.

* * * * *